United States Patent

[11] 3,591,101

| [72] | Inventors | Georges L. Gallet<br>La Celle Saint Cloud;<br>Claude Guenel, Orsay, both of, France |
|---|---|---|
| [21] | Appl. No. | 709,631 |
| [22] | Filed | Mar. 1, 1968 |
| [45] | Patented | July 6, 1971 |
| [73] | Assignee | Compagnie Generale D'Electricite |
| [32] | Priority | Mar. 3, 1967 |
| [33] | | France |
| [31] | | 97438 |

[54] MACHINE FOR CUTTING THIN STRIPS
7 Claims, 5 Drawing Figs.

[52] U.S. Cl. .................................................... 242/56.2,
83/176, 242/56.9, 242/65
[51] Int. Cl. ........................................................ B65h 35/02
[50] Field of Search ............................................ 242/56,
56.2, 56.3, 56.6, 56.9, 65, 66, 67.1, 67.5; 83/175,
176

[56] References Cited
UNITED STATES PATENTS

| 2,454,003 | 11/1948 | Pamphilon | 242/56.3 |
| 2,970,535 | 2/1961 | Schmutz | 242/65 X |
| 2,984,427 | 5/1961 | Rockstrom | 242/65 |
| 3,086,726 | 4/1963 | Aaron | 242/65 |
| 3,329,368 | 7/1967 | Mastriani | 242/56.2 |
| 3,350,026 | 10/1967 | Amos | 242/56.9 |
| 3,412,636 | 11/1968 | Seiff | 242/56.2 X |
| 3,424,395 | 1/1968 | Schmidt et al. | 242/56.9 X |

Primary Examiner—Stanley N. Gilreath
Assistant Examiner—Werner H. Schroeder
Attorney—Sughrue, Rothwell, Mion, Zinn and Macpeak ABSTRACT: The machine is equipped with balanced transfer mandrels which are dimensioned and positioned in such a way that a web to be cut into narrow strips is supported over its entire length and is subjected to a constant tension. Cutting blades are mounted in a blade-carrier which may be tilted to match the cutting angle to the type of web to be cut.

INVENTORS
GEORGES GALLET
CLAUDE GUENEL

BY *Sughrue, Rothwell, Mion, Zinn & Macpeak*

ATTORNEYS

MACHINE FOR CUTTING THIN STRIPS

The invention relates to a machine which is capable of cutting an extremely thin strip, having a thickness of the order of a few microns, into strips which are narrower.

The main application envisaged is the manufacture of wound capacitors. The dielectric utilized in the manufacture of wound capacitors may be, for example, paper or ethylene polyterephthalate (known under the trademark "Mylar"). The dielectric is manufactured in the form of strips which are wider than the axial length of the coil or winding; thus, it is necessary to cut a wide strip of this kind into two or more narrow strips each of which has the desired width.

In one type of known cutting machine, a strip unwound from a supply reel is fed over the cutting edge of a blade arranged in its path and to one or more takeup reels on which it is wound after having been cut. In other types, the strip is cut by a cutting wheel bearing on a mandrel. In still other types, a blade bears on a shallow groove formed in the surface of a mandrel over which the strip to be cut travels.

The best manner of manipulating a so-called "ultrathin" strip, i.e. one having a thickness of less than 8 microns, is to cause it to travel between a supply reel or bobbin and a takeup reel or bobbin, over a set of mandrels arranged so that the strip does not "float" at any point. In this manner, the formation of folds in the strip is avoided. This arrangement permits an output of strip at increased velocity and with considerable safety.

Once the strip has been cut into narrower strips, it is necessary to wind each narrow strip on an individual receiving reel, so that each narrow strip may be utilized individually, for example, as the winding of a capacitor. It is then convenient to group the even-number takeup reels on one spindle and the odd-number takeup reels on another spindle. In this manner, each reel is completely accessible at its two faces, thus facilitating the assembly and disassembly operations. Furthermore, the existence of a free space between two takeup reels has still another advantage, as will become clear at a later point in the description.

Furthermore, we have ascertained that the most advantageous method of cutting is not the same for flexible strips (for example, "Mylar") and for rigid strips (for example, paper). In the case of the former, it is advantageous that the blade should be operative in the sense of an extension of the strip carried by a mandrel, tending to space it away from the surface of the mandrel; in the case of the latter, it is advantageous that the blade should be effective in the sense of the urging of the strip towards the center of the mandrel.

According to the invention, a machine for cutting a thin, wide strip into a multiplicity of narrow strips comprises a supply reel or bobbin adapted to rotate about a first fixed axis, a cutting mandrel adapted to rotate about a fixed axis parallel to the first fixed axis and formed with at least one peripheral groove, a blade-carrier provided with blades each of which is adapted to engage one of the said grooves, at least two takeup reels or bobbins adapted to rotate about two separate fixed axes, first means for transferring the wide strip from the supply reel to the cutting mandrel, and second means for transferring the narrow strips leaving the cutting mandrel to takeup reels, such that the strip is supported over its entire length between the point at which it leaves the supply reel and the point at which each narrow strip is received on its takeup reel.

The invention will now be discussed in greater detail with reference to the accompanying drawings, wherein.

In all the figures, like reference numerals have the same meaning.

Figure 1A:
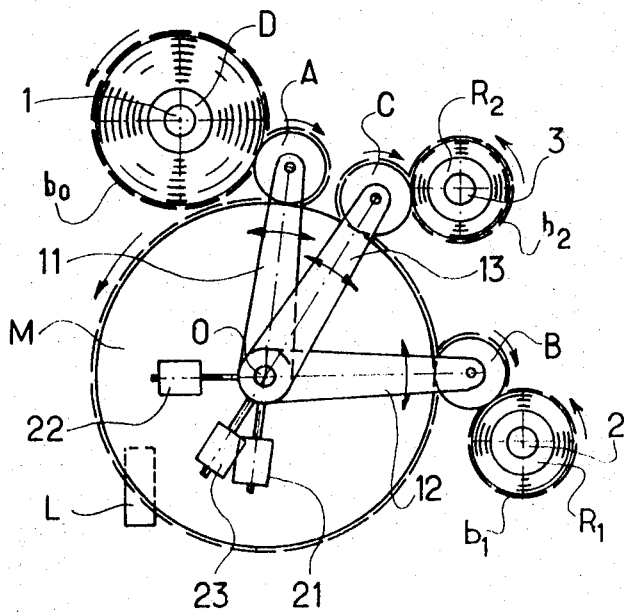
FIGS. 1a and 1b show a diagrammatic illustration of the machine according to the invention in two principal positions, i.e. with the supply reel full and with the supply reel empty.

Referring to FIG. 1a, a cutting machine comprises a supply reel D which is shown in the full condition and is adapted to rotate about a fixed axis on shaft 1, a cutting mandrel M adapted to rotate about a fixed axis on shaft O, a first takeup reel $R_1$ adapted to rotate about a fixed axis on shaft 2, and a second takeup reel $R_2$ adapted to rotate about a fixed axis on shaft 3.

Associated with the supply reel D is a transfer mandrel A, associated with the takeup reel $R_1$ is a transfer mandrel B, and associated with the takeup reel $R_2$ is a transfer mandrel C.

It will be understood that the machine comprises, in general, a multiplicity of takeup reels having a fixed axis defined by shaft 2 and an associated transfer mandrel, and a multiplicity of takeup reels having a fixed axis defined by shaft 3 and an associated transfer mandrel.

The transfer mandrels A, B, C preferably have the same diameter. The mandrel A is maintained by a support, shown diagrammatically at 11, and having for example the shape of a stirrup pivoting about the axis of shaft O. Similarly, the mandrels B and C are maintained by two supports 12 and 13, respectively, adapted to pivot about the axis of shaft O.

The mandrel A is maintained in equilibrium against the outer surface of the supply reel D by a counterweight 21; the mandrel B is maintained in equilibrium against the outer surface of the takeup reel $R_1$ by a counterweight 22; the mandrel C is maintained in equilibrium against the outer surface of the takeup reel $R_2$ by a counterweight 23.

In a variation, one or more transfer mandrels may be maintained in abutment with their associated reels by a spring.

It will be assumed that the cutting mandrel M is driven by a motor (not shown).

A wide strip $b_0$ leaving the supply reel at the tangent point D-A, embraces a portion of the lateral surface of the transfer mandrel A. It leaves the mandrel A at the tangent point A-M and embraces a portion of the lateral surface of the cutting mandrel M. Entrained by mandrel M, it is cut by a blade L which subdivides it into two narrow strips $b_1$, $b_2$. In the general case, there are $n$ blades all projecting at L, preferably; the strip is thus subdivided into ($n+1$) narrow strips.

Figure 1B:
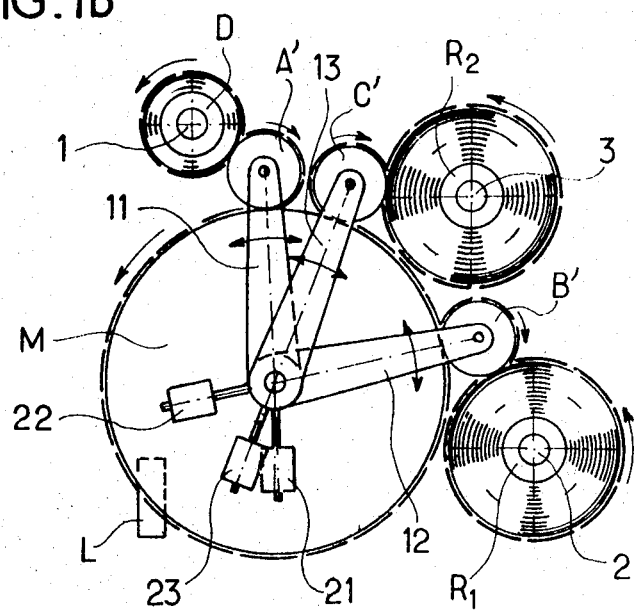

FIG. 1b shows the corresponding situation when the supply reel D is empty and the takeup reels $R_1$ and $R_2$ are full. No detailed explanation is required. It will be seen that the transfer mandrels A, B, C occupy new positions A', B', C'.

This arrangement causes the strip to embrace the largest possible portion of the lateral surface of the cutting mandrel and the largest possible portion of the lateral surfaces of the transfer mandrels.

Figure 2:
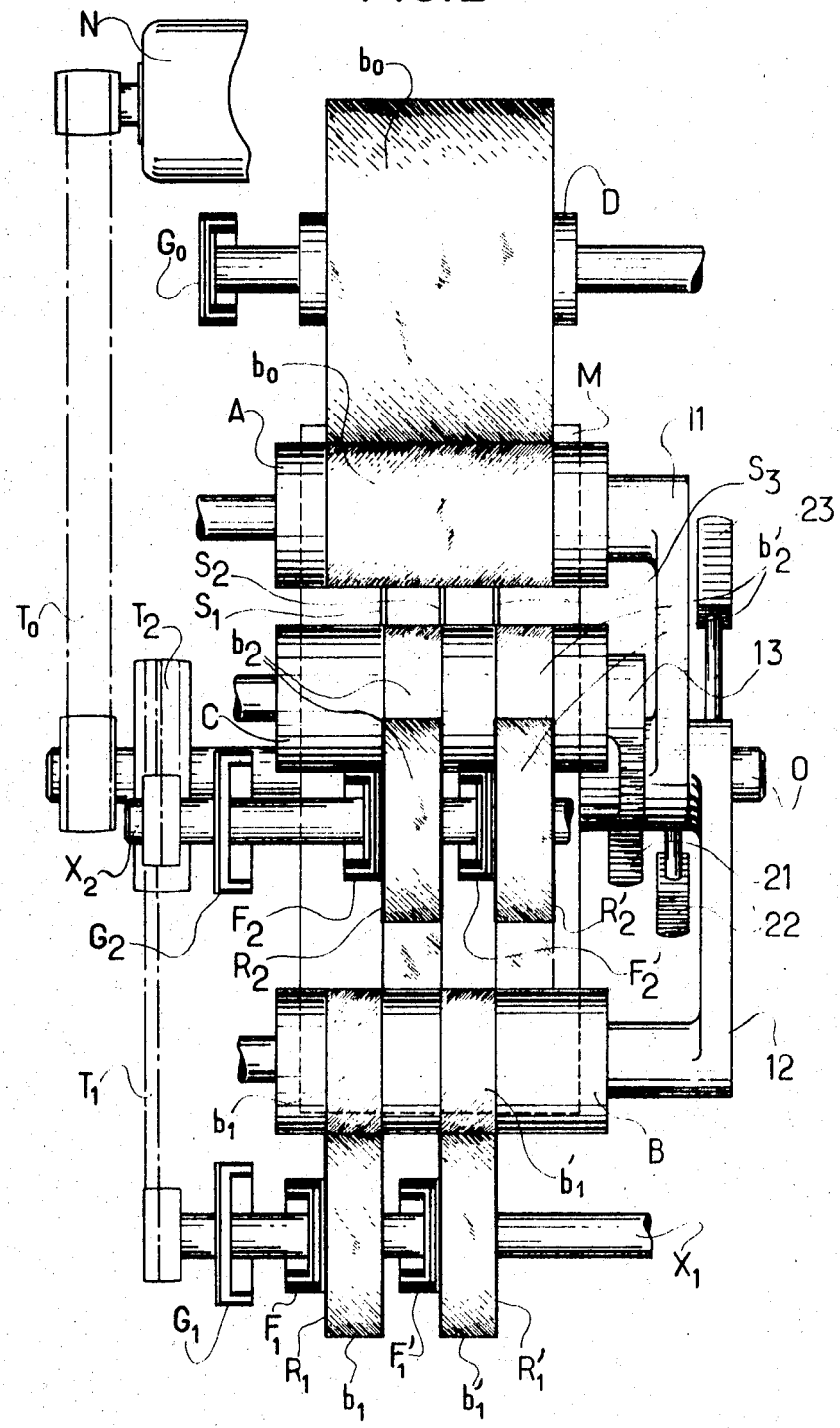
FIG. 2 is a plan view showing the arrangement of the takeup reels relatively to the cutting mandrel.
Figure 3:
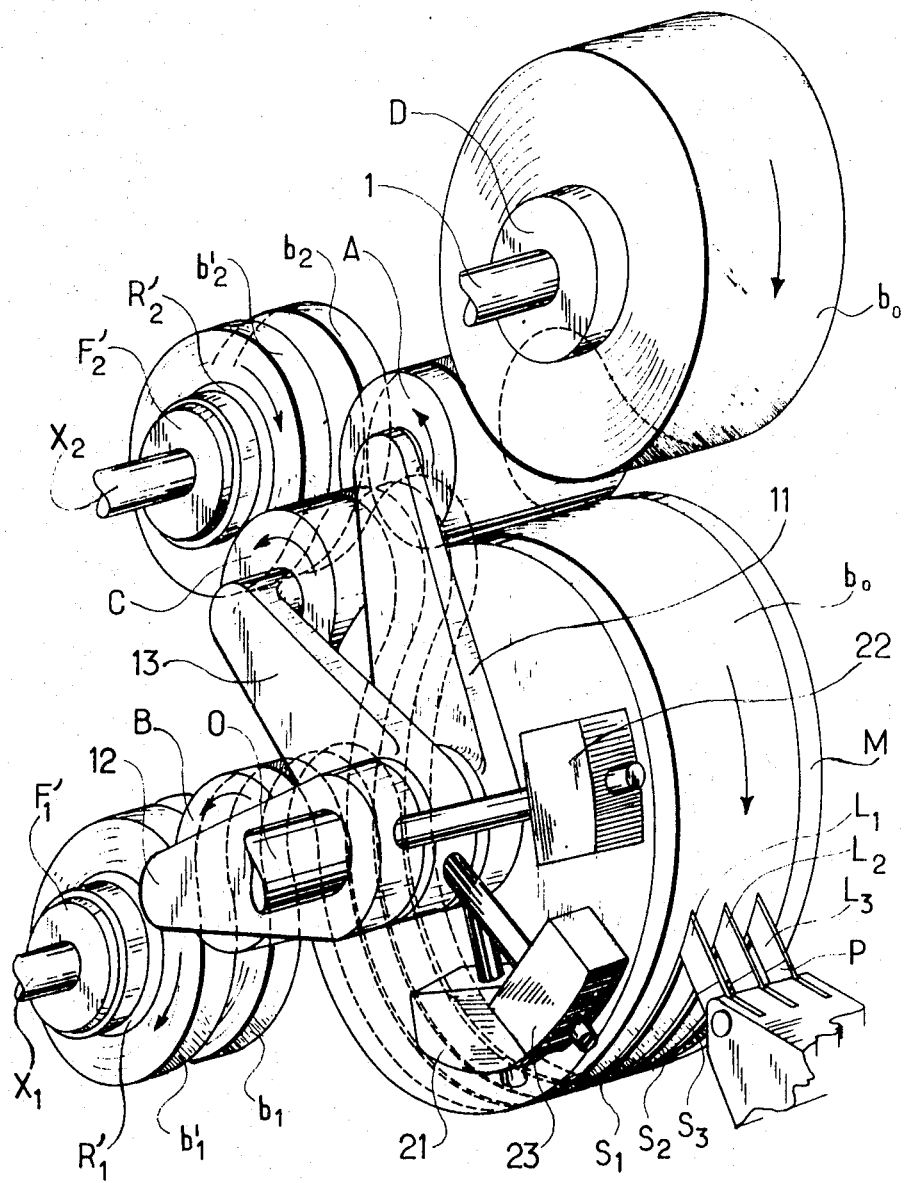
FIG. 3 is a perspective view corresponding to FIG. 2.

FIG. 2 is a simplified plan view showing the general kinematic arrangement of the apparatus and FIG. 3 is a perspective view. FIGS. 2 and 3 should be studied together. It will be assumed that the apparatus comprises three blades $L_1$, $L_2$, $L_3$ associated with which are, respectively, grooves $S_1$, $S_2$, $S_3$ in the cutting mandrel M. The blades $L_1$, $L_2$, $L_3$ and the grooves $S_1$, $S_2$, $S_3$ are visible in FIG. 3. The cutting mandrel M is driven by a motor N through a transmission $T_0$. A driving torque is transmitted to the supply reel D by the strip $b_0$ through the intermediary of the transfer mandrel A.

A calibrated resisting torque is applied to the supply reel D, for example with the aid of a magnetic coupler $G_0$ which permits the application of a couple which is a function of a magnetizing electric current acting on magnetic particles dispersed in a viscous medium.

Two takeup reels $R_1$, $R'_1$ having the same axis of rotation is defined by shaft $X_1$ receive two narrow strips $b_1$, $b'_1$ from one or more transfer mandrels B; two takeup reels $R_2$, $R'_2$ having the same axis of rotation is defined by shaft $X_2$ receive two narrow strips $b_2$, $b'_2$ through the intermediary of one or more transfer mandrels C.

Along the shaft $X_1$, a driving torque is applied through a transmission system $T_1$ and is transmitted through a magnetic coupler or the like $G_1$. Each takeup reel having shaft $X_1$ receives the couple through a friction member $F_1$, $F'_1$.

Takeup reels $R_2$, $R'_2$ are driven in the same manner about shaft $X_2$ through a transmission $T_2$, a magnetic coupler or the like $G_2$, and friction members $F_2$, $F'_2$.

It is the purpose of the couplers to effect the unwinding of the wide strip $b_o$ and the winding-up of the narrow strips under a constant tension which is carefully calibrated. If the resistant torque is excessively high, electrical charges may appear on the strip.

Since the strip may not be absolutely homogeneous over its width, the winding diameter of the various takeup reels having the same axis may vary from one reel to another. It is for this reason that it is preferable not to rigidly key on the same shaft all the takeup reels having the same axis. The torque is transmitted to the takeup reels by a friction member, for example, a calibrated spring, such as $F_1, F'_1, F_2, F'_2$.

It would also be possible to dispose magnetic couplers between two adjacent reels. However, this solution is difficult to apply in practice, since in general, the necessary spacing will not be available. Furthermore, since the number of narrow strips may be high, for example, higher than 10, a solution of this kind would be extremely expensive.

Figure 4:
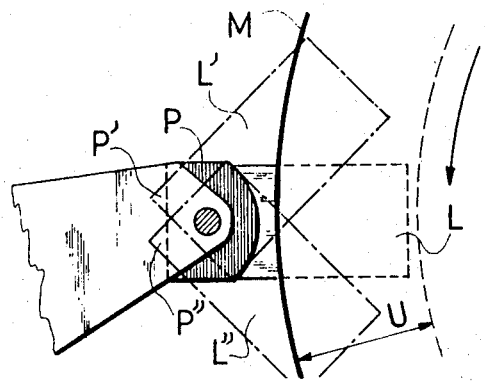
FIG. 4 shows, diagrammatically, various positions of the blade-carrier and of the associated blades.

FIG. 4 shows, diagrammatically, the various positions occupied by the blade-carrier relatively to the cutting mandrel M. At 1 is shown a blade-carrier engaged in a groove U, shown in broken lines. The blade-carrier has two extreme positions P′, P″ to which correspond, respectively, two positions L′, L″ of a blade L.

For rotation of the cutting mandrel as illustrated in FIG. 3, the position L′ wherein the strip tends to be detached from the mandrel corresponds to the cutting of a flexible product, such as "Mylar" (ethylene polyterephthalate) and the position L″ wherein the strip is urged towards the groove corresponds to the cutting of a rigid material, such as paper. This arrangement has the further advantage that, during a cutting operation, by slightly modifying the orientation of the blade-carrier, it becomes possible to displace the cutting point of a blade, thereby palliating wear effect on the cutting edge of the blade.

While the invention has been particularly shown and described with reference to a preferred embodiment thereof, it will be understood by those skilled in the art that various changes in form and details may be made therein without departing from the spirit and scope of the invention.

What we claim is:

1. In an apparatus for cutting a wide, thin strip into a multiplicity of narrow strips and including a supply reel for carrying said wide strip and adapted to rotate about a first fixed axis, the improvement comprising:
    a. a cutting mandrel adapted to rotate about a fixed axis parallel to the first axis and formed with at least one peripheral groove,
    b. a blade-carrier provided with blades each of which is adapted to engage in one of said grooves,
    c. at least two takeup reels adapted to rotate about two separate fixed axes,
    d. first means for transferring the wide strip from said supply reel to the cutting mandrel, and
    e. second means for transferring the narrow strips leaving the cutting mandrel to the takeup reels, whereby the strip is supported over its entire length between the point at which it leaves the supply reel and the point at which each narrow strip is received on its associated takeup reel, regardless of the amount of strip on the supply reel at any particular time,
    f. said first transferring means comprises a first transfer mandrel, means for permanently maintaining said first transfer mandrel tangent to the surface of said supply reel and permanently tangent also to said cutting mandrel, whereby: the strip travels between said supply reel and said first transfer mandrel and is nipped between said transfer mandrel and said cutting mandrel.

2. An apparatus according to claim 1 wherein said second transfer means comprises for each takeup reel a second transfer mandrel and means for maintaining said second transfer mandrel permanently tangential to the surface of an associated takeup reel and permanently tangential furthermore to said cutting mandrel, whereby: the narrow strip is nipped between said cutting mandrel and said transfer mandrel and travels between said transfer mandrel and said takeup reel.

3. An apparatus according to claim 1 wherein said means for permanently maintaining said first transfer mandrel tangent to the surface of said supply reel and permanently tangent to said cutting mandrel comprises: support means for maintaining the axis of said first transfer mandrel at a fixed distance from the axis of said cutting mandrel, and means for mounting said support means for pivoting about the axis of said cutting mandrel, whereby said first transfer mandrel is caused to roll on said cutting mandrel.

4. An apparatus according to claim 2 further comprising balanced counterweight means carried by said support means for maintaining each of said transfer mandrels tangential to the surface of its associated reel.

5. An apparatus according to claim 1 further comprising adjustable torque-coupling means associated with said supply reel and said takeup reels in such a manner as to insure constant tension of the wide strip and of the narrow strips.

6. An apparatus according to claim 5 wherein: said adjustable torque-coupling means comprises a magnetic coupler operatively associated with each of said takeup reels, and further comprising: a plurality of takeup reels adapted to rotate about each of said separate fixed axes, and friction means interposed between adjacent takeup reels on each of said separate fixed axes.

7. A first position being such and a second position being such as shown.